March 3, 1970  L. BLASCHKE  3,498,568
MOTION PICTURE CAMERA WITH SIGNAL GENERATING MEANS
Filed June 21, 1968
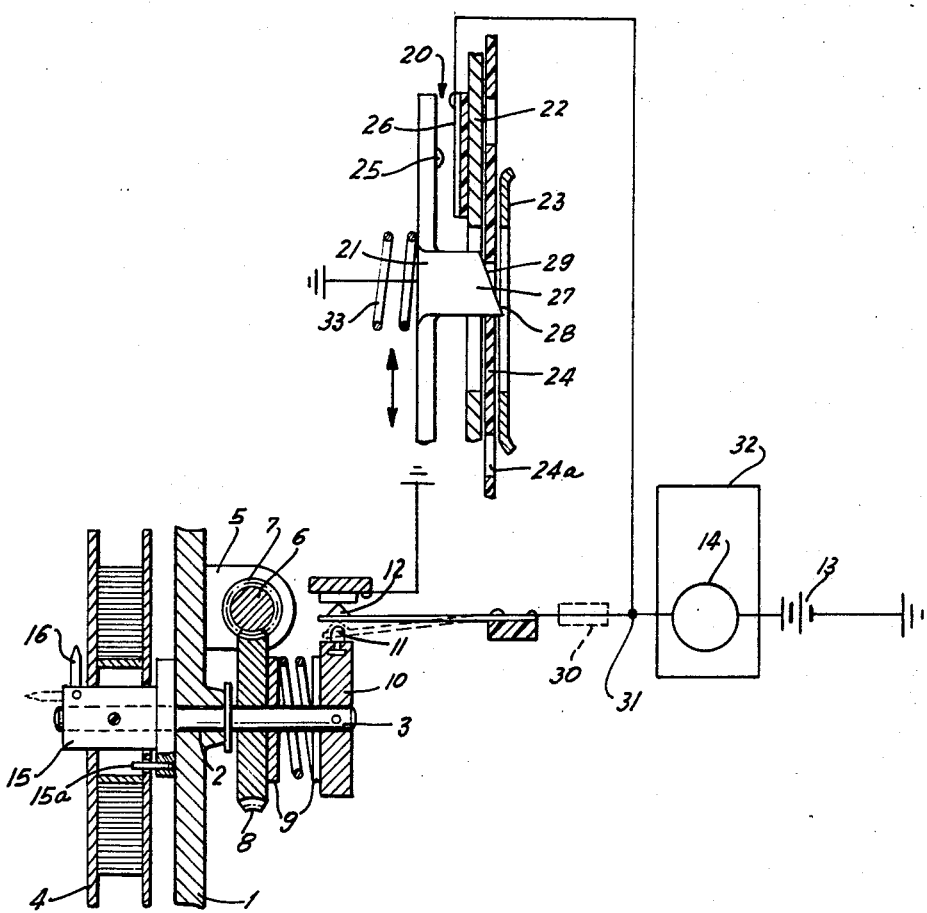
INVENTOR
LUDWIG BLASCHKE
BY
*Th. Nael J. Striker*
ATTORNEY United States Patent Office 3,498,568
Patented Mar. 3, 1970

3,498,568
MOTION PICTURE CAMERA WITH SIGNAL
GENERATING MEANS
Ludwig Blaschke, Gatzingerplatz 3/I,
8 Munich 25, Germany
Filed June 21, 1968, Ser. No. 738,916
Claims priority, application Germany, June 21, 1967,
N 30,751
Int. Cl. G11b 15/32
U.S. Cl. 242—191                                           10 Claims

ABSTRACT OF THE DISCLOSURE

A motion picture camera wherein the shaft 3 for the takeup reel 4 is rotated by way of a slip clutch 9 and effects intermittent closing of a first electric switch 12 to complete the circuit of a lamp 14 in the view finder 32 and to thus indicate satisfactory collection of exposed film 24 on the reel. A second electric switch 20 is connected in parallel with the first switch and is closed by the pull-down 21 when the latter's claw 27 detects a damaged portion of the film or when the trailing end of the film advances beyond the claw whereby the lamp produces a continuous signal. A resistor 30 is connected in series with the first switch to weaken the intermittently produced signals and to thus facilitate discrimination between signals which are respectively produced on closing of the first and second switches.

BACKGROUND OF THE INVENTION

The present invention relates to photographic apparatus in general, and more particularly to improvements in motion picture cameras. Still more particularly, the invention relates to improvements in signal generating means which are utilized in motion picture cameras to indicate the position and/or condition of motion picture film.

It is already known to provide a motion picture camera with a device which produces signals to indicate proper transport of film by the film transporting mechanism. In accordance with a prior proposal, the film transporting mechanism comprises a pull-down which advances the film stepwise and a blocking member which enters a perforation during each interval between successive advances to hold the film against movement while the shutter admits light to an unexposed film frame. The blocking member constitutes the movable contact of an electric switch which forms part of an electric circuit including a signal generating device arranged to produce signals whenever the blocking member is disengaged from the film. As a rule, the signal generating device is a lamp which can be observed by looking through the view finder. A drawback of such proposal is that signals produced by the lamp are of very short duration. Thus, if the film is transported at the average speed of 16 or 18 frames per second, the lamp produces the same number of signals per second so that the operator's eye is bothered by the rapid sequence of light flashes and the operator is likely to be distracted during observation of the scene or subject through the view finder.

Another drawback of the just described prior proposal is that the blocking member is mounted at a point well ahead of the takeup spool or reel, i.e., upstream of and far away from the station where the exposed film is collected. Consequently, the lamp cannot indicate whether or not the film is properly transported all the way to the collecting station or whether or not the film is properly collected by the takeup reel. It happens frequently that the film jams in the film path downstream of the pull-down and/or that the film tears between the pull-down and the takeup reel. Furthermore, and if the film is collected by a takeup reel which is accommodated in a magazine, it is likely to spill in the interior of the magazine and to undergo damage which remains undetected if the signals indicating the condition of film are produced well ahead of the collecting station.

SUMMARY OF THE INVENTION

It is an object of the present invention to provide a motion picture camera with a signal generating means which is capable of indicating the condition of motion picture film in the region upstream of and at the point where the film is engaged by the film transporting mechanism, as well as the condition of film in the region between such film transporting mechanism and the collecting station for exposed film.

Another object of the invention is to provide a motion picture camera with a signal generating means which occupies little room, which is of simple and rugged design, which consumes little or no energy, and which can produce a plurality of different signals each of which can indicate the condition of film or of camera parts in a different portion of the path along which the film advances from the supply reel to the takeup reel.

An additional object of the invention is to provide a motion picture camera with a signal generating means which can indicate the condition of motion picture film, particularly the presence or absence of film in the film path as well as tears or other damage to the film, irrespective of the speed at which the film is transported and at intervals which are not likely to distract the photographer when the camera is in use.

A further object of the invention is to provide a signal generating means which can produce a first type of signals to indicate the condition of film at the collecting station and a second type of signals to indicate the condition of film upstream of the collecting station in such a way that the photographer can readily discriminate between the two types of signals.

A concomitant object of the invention is to provide a motion picture camera wherein the generation of signals can be initiated by parts which receive motion from or constitute essential components of an operative camera.

The novelty resides in the provision of a motion picture camera which comprises a housing, rotary film collecting means mounted in the housing, drive means for rotating the film collecting means and including a prime mover and slip clutch means interposed between the prime mover and the collecting means to rotate the latter at a predetermined range of speeds when the operation of the collecting means is satisfactory, signal generating means, and actuating means provided on or movable with the collecting means for intermittently operating the signal generating means in response to rotation of the collecting means at one of the predetermined range of speeds. The signal generating means may include one or more devices which can furnish visible and/or audible signals.

In accordance with another feature of the invention, the signal generating means can be operated by a detector which forms part of or is movable with the pull down of the film transporting means to cause the generation of a continuous signal when the pull down is free to move across the path of motion picture film, i.e., when the film or a portion of the film tears or is otherwise damaged and/or when the trailing end of the film advances beyond the pull-down. Means is provided to facilitate discrimination between signals which are respectively produced by the signal generating means on operation by the actuating means and by the detector.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of ceratin specific embodiments with reference to the accompanying drawing.

BRIEF DESCRIPTION OF THE DRAWING

The single figure is a fragmentary schematic partly sectional view of a motion picture camera which embodies one form of the invention.

DESCRIPTION OF THE PREFERRED EMBODIMENTS

The drawing illustrates certain parts of a motion picture camera which embodies one form of the present invention. The camera comprises a housing or body having a wall 1 provided with a bearing 2 for a takeup shaft 3 which forms part of a film collecting device. This film collecting device further comprises a takeup reel 4 which is rotatably mounted on a hub or boss 15 of the takeup shaft 3 and receives torque by way of an eccentric pin 15a which is rigid with the shaft 3. The latter is further provided with a pivotable retaining post 16 which can be moved between the solid-line and phantom-line positions to thereby respectively hold the reel 4 against axial movement and to permit removal of the reel in a direction away from the pin 15a.

The drive means for the takeup shaft 3 comprises an electric motor, a spring motor or an analogous prime mover having an output shaft 6 which is rotatable in a bearing 5 of the wall 1 and is provided with a worm 7 meshing with a worm wheel 8 which is rotatable on the takeup shaft 3. A friction clutch or slip clutch 9 is interposed between the worm wheel 8 and shaft 3 so that the latter can lag behind the worm wheel when the camera is in use and the prime mover rotates the worm drive 7, 8 at a constant speed. This is necessary for obvious reasons since the angular speed of the takeup reel 4 decreases proportionally with increasing diameter of exposed film 24 which is being convoluted on its core. The shaft 6 also drives the film transporting mechanism of the camera by transmitting motion to a reciprocable pull-down 21 which will be described later.

The signal generating means of the camera comprises an electric circuit including a battery 13 or another suitable source of electrical energy in series with a signal generating lamp 14 and a normally open electric switch 12 having a fixed contact and a movable contact adapted to be moved against the fixed contact by a trip or lobe 11 provided on an actuating member 10 here shown as a wheel which is rigid with the takeup shaft 3.

It is clear that the takeup reel 4 may be installed in a magazine (not shown) which is inserted into or is attached to the housing of the camera. The magazine is then provided with a suitable opening or cutout which permits entry of the takeup shaft 3 into motion transmitting engagement with the takeup reel.

When the film 24 is transported in the normal way, the output shaft 6 of the prime mover drives the takeup shaft 3 and the takeup reel 4 at a speed which decreases gradually in response to increasing diameter of convoluted film on the core of the reel 4 whereby the slip clutch 9 permits the worm wheel 8 to slip with reference to the shaft 3. The lobe 11 of the actuating member 10 causes the switch 12 to close once during each revolution of the reel 4 so that the frequency at which the lamp 14 lights up decreases gradually. The lamp 14 is installed behind the view finder window 32 or in such position that it can be observed by looking through the view finder. When the operator of the camera notes that the lamp 14 lights up again and again, this serves as an indication that the transport of film is satisfactory all the way between the supply reel (not shown) and the takeup reel 4. The intervals at which the lamp 14 lights up are longer than in aforedescribed prior cameras wherein the frequency of signal generation corresponds to the number of film frames which are exposed per second. As a rule, the lamp 14 produces signals at intervals of 1-2 seconds which is much less bothersome to the operator's eye than a sequence of visual signals which are produced at a frequency of 16 or more per second. An experienced photographer can calculate the length of time which is required to take pictures of a scene by memorizing the number of signals which are produced by the lamp 14 from the moment when the trigger is depressed to the moment when the trigger is released.

If the manner in which the film 24 is being convoluted on the reel 4 is unsatisfactory, for example, if the transport of film is blocked so that the reel 4 comes to a standstill, the operator notes the absence of visual signals and arrests the prime mover before the camera or the film sustains substantial damage. Alternatively, and if the shaft 3 happens to come to a standstill in a position in which the lobe 11 of the wheel 10 maintains the switch 12 in closed position, the operator notes the uninterrupted signal and is informed that the prime mover should be arrested without delay.

The shaft 3 can come to a standstill for a number of reasons, for example, if the perforations 24a of the film 24 are torn so that the claw 27 of the pull-down 21 cannot transport the film in the normal way. Furthermore, the shaft 3 is arrested if the tip 28 on the claw 27 of the pull-down 21 breaks so that the pull-down ceases to advance film toward the reel 4. Also, the exposed film can jam between the flanges of the reel 4 or in the interior of a magazine which contains the takeup reel. Finally, the film can jam in the path between claw 27 and the reel 4.

In accordance with another feature of the present invention, the lamp 14 (or a separate signal generating device) can light up when the trailing end of the film 24 advances beyond the pull-down 21 and/or when the perforations 24a of film 24 are damaged or destroyed. As shown in the drawing the electric circuit of the signal generating means comprises a second electric switch 20 connected in parallel with the switch 12 and including an insulated fixed contact 26 and a second contact 25 which is mounted on and shares movements of the pull-down 21. The claw 27 of the pull-down constitutes a detector which tracks the film 24 and causes the switch 20 to close in order to complete the circuit of the lamp 14 when the trailing end of film moves beyond the claw 27. The pull-down 21 is biased by a spring 33 which urges the claw 27 against the film so that the tip 28 of the claw can enter the adjoining perforation 24a. The film 24 advances in a path defined by a gate including two guide members 22, 23. The inclined face 29 of the claw 27 engages the film 24 at the trailing end of the adjoining perforation 24a when the film is properly transported by the pull-down 21 whereby the film prevents the contact 25 from moving into engagement with the contact 26, i.e., the switch 20 remains open. However, if the film 24 is torn or damaged in the region of the perforations 24a so that the entire claw 27 can penetrate across the film path, the switch 20 closes and causes the lamp 14 to produce a continuous signal. When the operator detects a continuous signal, he can observe the frame counter in order to determine whether the entire film is exposed or whether the film is torn or damaged so that the switch 20 has closed prior to advance of the trailing end of the film beyond the claw or detector 27 of the pull-down 21.

In accordance with still another feature of the present invention, the electric circuit of the signal generating means may comprise a suitable resistor 30 (indicated by broken lines) which is placed in series with the switch 12 to reduce the flow of current through the lamp 14 on closing of the switch 12 but not on completion of the circuit in response to closing of the switch 20 (see the position of the tap 31). In this way, the operator can readily discriminate between relatively weak signals which are furnished by the lamp 14 when the collecting means 3, 4 is at a standstill and a stronger signal which are furnished by lamp 14 in response to closing of the switch 20. Another advantage of the resistor 30 is that the signals produced by lamp 14 in response to closing of the switch 12 are less likely to distract the operator's attention from the scene when the camera is in use.

It will be noted that the structure shown in the drawing is capable of producing signals which indicate a plurality of different disturbances, damages or defects, namely, stoppage of the shaft 3 due to jamming of exposed film downstream of the film transporting mechanism, improper winding of film onto the reel 4 or onto the reel in a magazine, exhaustion of the supply of unexposed film, damage to film in the region of its perforations, tearing of film, jamming of film in the gate defined by guide members 22, 23, breakage of the film transporting mechanism, and/or a combination of the above defects. Furthermore, the signal generating means can produce plural types of signals even though it employs a single signal generating device. However, it is equally within the purview of the present invention to connect the switch 20 in series with the battery 13 or with another source of electrical energy and with a second signal generating device, e.g., a lamp, a bell or the like.

Of course, the structure shown in the drawing also indicates to the operator if and when the camera contains film, that the film is being properly transported to the takeup reel 4, and that the film transporting mechanism and the film collecting means operate properly. In other words, the operator can detect defects of the film or faulty operation of moving parts of the camera as well as the fact that the film is satisfactory, that the camera is ready for use, and that the film transporting and collecting mechanisms are in operative condition.

The improved camera can be modified in a number of ways without departing from the spirit of my invention. For example, the lamp 14 or the entire electric circuit can be replaced by a signal generating means which furnishes audible signals. The shaft 3 or the actuating wheel 10 then carries one or more cams or trips which cooperate with a diaphragm to produce a series of readily detectable audio signals in response to rotation of the film collecting means. An advantage of such acoustic signal generating means is that it does not consume any electrical energy. The user notes that the operation of the film collecting means is unsatisfactory if the signal generating means ceases to furnish audible signals or if the signals are produced at rapidly following intervals. The absence of signals normally indicates jamming of exposed film and excessive frequency of such signals indicates a tear of film or complete convolution of film on the reel 4.

The signal generating means with one or more lamps 14 or analogous devices for production of visible signals is preferred when the camera employs film with a sound track, i.e., when the audible signals would be likely to be recorded on the sound track.

It is also possible to employ the impulses produced on closing of the switch 12 or an analogous switch for operation of an electronic frame counter which measures and records the length of exposed film. Electronic means may be provided in or combined with the circuit of the counter to compensate for the fact that the length of intervals between successive impulses increases in response to increasing diameter of exposed film on the reel 4, i.e., that the rotational speed of the shaft 3 decreases gradually when the operation of the film collecting means is normal.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. In a photographic apparatus, particularly in a motion picture camera, a combination comprising a housing; rotary film collecting means supported by said housing; drive means supported by said housing and arranged to rotate said collecting means, said drive means including prime mover means and slip clutch means interposed between said prime mover means and said collecting means to rotate the latter at a predetermined range of speeds when the operation of said collecting means is satisfactory; signal generating means; and actuating means receiving motion from said collecting means for intermittently operating said signal generating means in response to rotation of said collecting means.

2. A combination as defined in claim 1, wherein said signal generating means comprises a device for producing audible signals.

3. A combination as defined in claim 1, wherein said signal generating means comprises an electric circuit including a device for producing visible signals on completion of said circuit, said actuating means comprising means for intermittently completing said circuit in response to rotation of said collecting means.

4. A combination as defined in claim 1, wherein said signal generating means comprises electronic frame counter means and wherein said actuating means is arranged to produce electric signals to thereby operate said counter means in response to rotation of said collecting means.

5. A combination as defined in claim 1, further comprising detector means for operating said signal generating means in response to detection of defects in or in response to absence of film upstream of said collecting means.

6. A combination as defined in claim 5, further comprising guide means defining a path for film upstream of said collecting means and film transporting means including said detector means and arranged to move said detector means across said path in the absence of film in said path and also when the portion of film in said path is damaged, said detector means being arranged to operate said signal generating means in response to movement across said path.

7. A combination as defined in claim 6, wherein said signal generating means comprises an electric circuit including a signal generating device which produces signals on completion of said circuit, and normally open switch means in series with said device and arranged to close in response to movement of said detector means across said path to thus complete said circuit.

8. A combination as defined in claim 5, wherein said signal generating means comprises an electric circuit including a device which produces visible signals on completion of said circuit and wherein said actuating means and said detector means are respectively arranged to complete said circuit in response to rotation of said collecting means and on detection of defects in or due to absence of film so that signals produced by said device in response to completion of the circuit by said actuating means normally indicate satisfactory operation of said collecting means and signals produced by said device on completion of the circuit by said detector means indicate defects in or absence of film.

9. A combination as defined in claim 5, further comprising means for facilitating discrimination between signals produced by said signal generating means on operation by said actuating means and said detector means.

10. A combination as defined in claim 9, wherein said discrimination facilitating means comprises means for weakening the intensity of signals produced by said signal generating means on operation by said actuating means.

References Cited

UNITED STATES PATENTS

| | | | |
|---|---|---|---|
| 2,912,178 | 11/1959 | Schuyler | 242—55.12 |
| 2,948,258 | 8/1960 | Koechel | 116—67 |
| 2,951,653 | 9/1960 | Haenel | 242—55.12 |
| 3,017,803 | 1/1962 | Sakaki | 242—57 |

LEONARD D. CHRISTIAN, Primary Examiner

U.S. Cl. X.R.

242—57